United States Patent
Ryu et al.

(10) Patent No.: US 12,475,602 B2
(45) Date of Patent: Nov. 18, 2025

(54) NEURAL NETWORK-BASED IMAGE COMPRESSION METHOD

(71) Applicant: Research & Business Foundation SUNGKYUNKWAN UNIVERSITY, Suwon-si (KR)

(72) Inventors: Eun-Seok Ryu, Seoul (KR); Soonbin Lee, Seongnam-si (KR); Jong-Beom Jeong, Yangju-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 351 days.

(21) Appl. No.: 18/338,613

(22) Filed: Jun. 21, 2023

(65) Prior Publication Data
US 2024/0135590 A1    Apr. 25, 2024

(30) Foreign Application Priority Data
Jun. 22, 2022   (KR) .......................... 10-2022-0076272

(51) Int. Cl.
  *G06T 9/00*    (2006.01)
  *G06T 7/00*    (2017.01)
(52) U.S. Cl.
  CPC .............. *G06T 9/00* (2013.01); *G06T 7/0002* (2013.01); *G06T 2207/20081* (2013.01); *G06T 2207/30168* (2013.01)
(58) Field of Classification Search
  CPC .................... G06T 9/00; G06T 7/0002; G06T 2207/20081; G06T 2207/30168
(Continued)

(56) References Cited

U.S. PATENT DOCUMENTS

2023/0298219 A1*  9/2023  Galpin ................... H04N 19/61
                                                              382/232

FOREIGN PATENT DOCUMENTS

JP          2016-106299 A      6/2016
KR    10-2022-0027208 A      3/2022
(Continued)

OTHER PUBLICATIONS

Kim, Sang Hoon, Jae Hyun Park, and Jong Hwan Ko. "Target-dependent scalable image compression using a reconfigurable recurrent neural network." IEEE Access 9 (2021): 119418-119429. (Year: 2021).*

(Continued)

*Primary Examiner* — Jonathan S Lee
(74) *Attorney, Agent, or Firm* — NSIP Law (57) ABSTRACT

A method of learning a neural network-based image compression model according to the disclosed embodiment, may include receiving a learning target image as an input; encoding the input image through the neural network-based image compression model configured to include a weight parameter, and decoding the encoded image through the neural network-based image compression model; calculating an entropy estimation value for a network model weight of the neural network-based image compression model; calculating a reconstruction performance value by comparing qualities of the learning target image and the decoded image; and learning the neural network-based image compression model by updating the weight parameter of the neural network-based image compression model based on the entropy estimation value for the network model weight and the reconstruction performance value. Accordingly, it is possible to minimize the size of the weight of the neural network-based image compression model.

11 Claims, 6 Drawing Sheets

(58) Field of Classification Search
USPC .......................................................... 382/232
See application file for complete search history.

(56) References Cited

FOREIGN PATENT DOCUMENTS

KR   10-2022-0027435 A   3/2022
WO   WO 2022/084702 A1   4/2022

OTHER PUBLICATIONS

Li, Mu, et al. "Efficient and effective context-based convolutional entropy modeling for image compression." IEEE Transactions on Image Processing 29 (2020): 5900-5911. (Year: 2020).*

Li, Mu, et al. "Learning Context-Based Non-local Entropy Modeling for Image Compression." IEEE Transactions on Neural Networks and Learning Systems, arXiv:2005.04661v1 [eess.IV] May 10, 2020, (12 pages, previously cited in IDS of Nov. 7, 2023).

Korean Office Action Issued on Dec. 26, 2023, in Counterpart Korean Patent Application No. 10-2022-0076272 (1 page in English, 2 Pages in Korean).

Li, Mu, et al. "Learning Context-Based Non-local Entropy Modeling for Image Compression." IEEE Transactions on Neural Networks and Learning Systems, arXiv:2005.04661v1 [eess.IV] May 10, 2020, (12 pages).

Korean Office Action issued on Aug. 21, 2023, in counterpart Korean Patent Application No. 10-2022-0076272 (6 pages in Korean).

* cited by examiner

NEURAL NETWORK-BASED IMAGE COMPRESSION METHOD

CROSS-REFERENCE TO RELATED APPLICATION

This application claims the benefit of Korea Patent Application No. 10-2022-0076272 filed on 22 Jun. 2022, which are incorporated herein by reference for all purposes as if fully set forth herein.

BACKGROUND OF THE INVENTION

Field of the Invention

The present disclosure relates to a neural network-based image compression method, and more specifically, to a neural network-based image compression method for updating image compression model weights by reflecting both image reconstruction performance and estimated entropy of network model weights in an artificial neural network learning process.

Description of the Related Art

Image compression is one of the major technical topics in the field of multimedia and signal processing. Basic image compression algorithms perform frequency conversion, quantization, and entropy encoding processes to remove spatial redundancy. For example, in JPEG, which is a representative image codec, images are compressed using a discrete cosine transform.

Conventional image and video codec technologies have been standardized and optimized, and recently, artificial intelligence-based image compression technology is receiving attention. Attempts to design an efficient compression codec through a data-centric learning model are ongoing, and a representative deep image compression model is a model based on an auto-encoder.

In a general neural network-based image compression method, compression and reconstruction can be performed only when weights of a pre-learned model are transmitted. Accordingly, a process of pre-transmitting the weights of the learned model is essential, but the size of the weights to be transmitted is a problem. In the artificial neural network learning process, a method for minimizing the size of the weight when modifying the weight of the neural network is required.

SUMMARY OF THE INVENTION

The present disclosure is to solve the problems of the related art as described above, and provides a neural network-based image compression method that minimizes image compression model weights by updating image compression model weights by reflecting both image reconstruction performance and estimated entropy of network model weights in an artificial neural network learning process.

In order to solve the above technical problem, a method of learning a neural network-based image compression model according to the disclosed embodiment, may comprise receiving a learning target image as an input; encoding the input image through the neural network-based image compression model configured to include a weight parameter, and decoding the encoded image through the neural network-based image compression model; calculating an entropy estimation value for a network model weight of the neural network-based image compression model; calculating a reconstruction performance value by comparing qualities of the learning target image and the decoded image; and learning the neural network-based image compression model by updating the weight parameter of the neural network-based image compression model based on the entropy estimation value for the network model weight and the reconstruction performance value.

In the method of learning an image compression model according to the disclosed embodiment, the entropy estimation value for the network model weight may be derived to be minimized.

In the method of learning an image compression model according to the disclosed embodiment, a substitution function to which a uniform distribution is added may be used to minimize the entropy estimation value for the network model weight.

In the method of learning an image compression model according to the disclosed embodiment, the substitution function to which the uniform distribution is added may add a uniform distribution in a range of −0.5 to 0.5 to the network model weight by an approximate estimation method.

In the method of learning an image compression model according to the disclosed embodiment, the updating the weight parameter of the neural network-based image compression model may be performed by adjusting the entropy estimation value for the network model weight through the parameter.

The neural network-based image compression method according to the disclosed embodiment provides the following effects.

When the weights of the neural network-based image compression model are modified, the size of the weights of the image compression model may be minimized by adding the entropy value of the network model weights to a loss function that is a reference.

BRIEF DESCRIPTION OF THE DRAWINGS

The accompanying drawings, which are included to provide a further understanding of the present disclosure and constitute a part of the detailed description, illustrate embodiments of the present disclosure and serve to explain technical features of the present disclosure together with the description.

DETAILED DESCRIPTION OF THE EMBODIMENTS

Hereinafter, the present disclosure will be described in detail with reference to embodiments and drawings. However, the following description is not intended to limit the present disclosure to specific embodiments, and in describing the present disclosure, if it is determined that the detailed description of related known technologies may obscure the gist of the present disclosure, the detailed description will be omitted.

Figure 1:
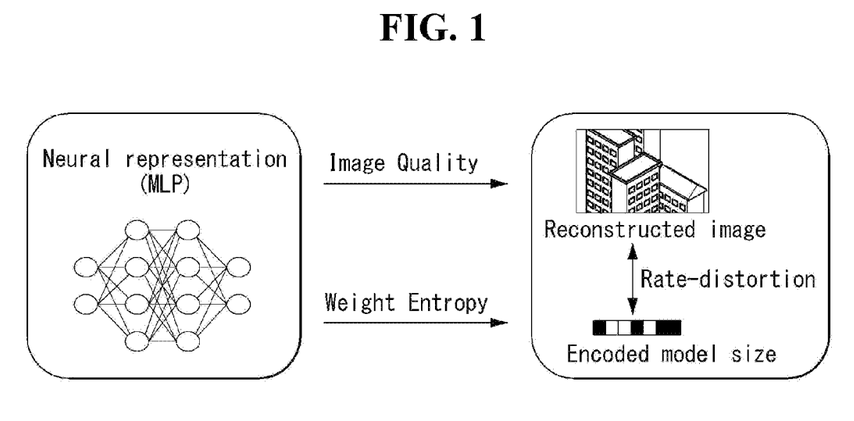
FIG. 1 is a diagram showing an image compression framework in the disclosed embodiment.

FIG. 1 is a diagram showing an image compression framework in the disclosed embodiment.

In the disclosed embodiment, updating of a weight parameter of a neural network-based image compression model is performed by comparing image qualities between an original target image and a decoded final image, and an estimated entropy of a network model weight may also be reflected.

Figure 2:
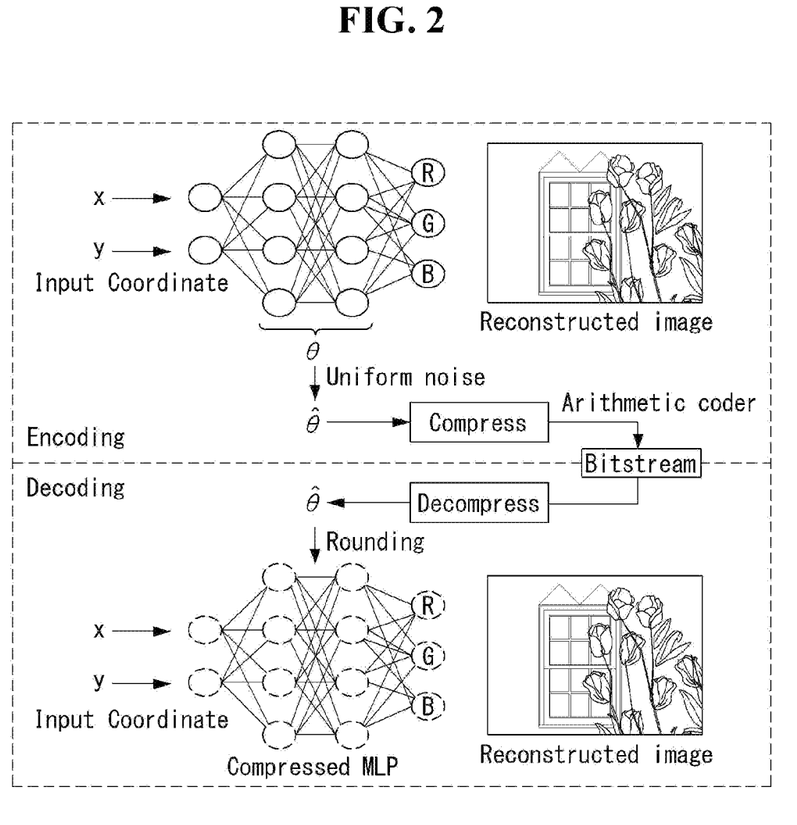
FIG. 2 is a diagram illustrating encoding and decoding structures of an image compression model in the disclosed embodiment.

FIG. 2 is a diagram illustrating encoding and decoding structures of an image compression model in the disclosed embodiment.

In the disclosed embodiment, after learning is completed, transmission and reconstruction of compressed images may be performed by compressing the network weights using an arithmetic coder, transmitting them as binary bitstreams, decoding them again, and using them as weights for a multilayer perceptron. In this case, unlike the convolution-based compression model, it is a form of compressing and transmitting the weights of the overfitting network for each individual image.

Figure 3:
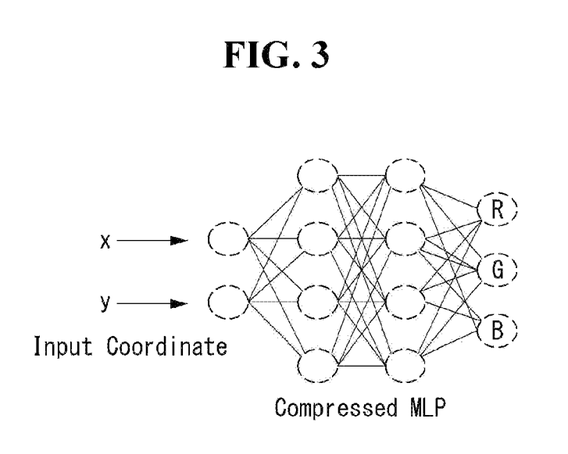
FIG. 3 is a diagram conceptually illustrating an image compression network model in the disclosed embodiment.

FIG. 3 is a diagram conceptually illustrating an image compression network model in the disclosed embodiment.

The updating of the weight parameters of the image compression model is performed by comparing the image qualities between the original target image and the final decoded image, and the following loss function is used.

$$\mathcal{L}_{img} = \min_{\theta} \sum_{x,y} \|f_\theta(x, y) - I(x, y)\|_2^2 \qquad \text{[Equation 1]}$$

Here, x and y correspond to coordinate values of an image, f is an image reconstructed with a neural network (i.e. a decoded image), and I is an original image. Reconstructed image quality performance is measured through mean squared error between an input original image and a reconstructed image or a peak signal-to-noise ratio (PSNR).

Referring to FIG. 3, in the disclosed embodiment, the image compression network model may receive image coordinate values x and y and output RGB (color) values. Here, if the network model weight is θ, the entropy of the weight may be expressed as follows.

$$I(\theta) = -\log_2 q(\theta) \qquad \text{[Equation 2]}$$

The network model weight θ has a matrix value.

In the disclosed embodiment, arithmetic coding may be used as a method for compressing a network model. The arithmetic coding is entropy encoding, and the lower the entropy value of a symbol, the smaller the number of bitstreams can be used to represent the whole, so it is desirable to lower an entropy value of the network model weight θ.

When a weight entropy I(θ) of the network model is calculated through the above Equation and induced to be minimized in the neural network learning process, since the weight matrix θ of the network model has discrete values, the differential value is not properly propagated during the learning process, so the learning process is not performed as desired. In the disclosed embodiment, the weight entropy may be minimized by using a substitution function to which a uniform distribution is added to mitigate the discrete values. The substitution function to which a uniform distribution is added is as follows.

$$\Phi(\theta) = q(\theta + u), u \sim \mathcal{U}\left(-\frac{1}{2}, \frac{1}{2}\right) \qquad \text{[Equation 3]}$$

In the disclosed embodiment, the substitution function to which the uniform distribution is added may be to add a uniform distribution in a range of −0.5 to 0.5 to the network model weights as an approximate estimation method.

The weight entropy of the network model using the substitution function to which the uniform distribution is added is expressed as follows.

$$\mathcal{L}_{entropy} = \sum_{\hat{\theta} \in \Phi} I(\hat{\theta}) \qquad \text{[Equation 4]}$$

Through this, entropy estimation for real-valued weights, which was a difficulty in entropy calculation, becomes possible. When the above equation is reflected in the update of the weight parameter of the image compression model together with the image reconstruction performance loss function, it is as follows.

$$\mathcal{L}_{total} = \underbrace{\mathcal{L}_{img}}_{Distortion} + \lambda \underbrace{\mathcal{L}_{entropy}}_{Rate} \qquad \text{[Equation 5]}$$

The final loss function of the disclosed embodiment is the same as Equation 5 above, and the weight parameters of the neural network-based image compression model may be updated so that the entropy of the network model weight is minimized while the image reconstruction performance is high.

In the disclosed embodiment, the entropy estimation value for the network model weight may be adjusted through an adjustment parameter A, and the adjusted entropy estimation value may be reflected in updating the weight parameter of the image compression model. It is possible to observe the trade-off between the size of the compressed model and the model performance while varying the adjustment parameter A.

Figure 4:
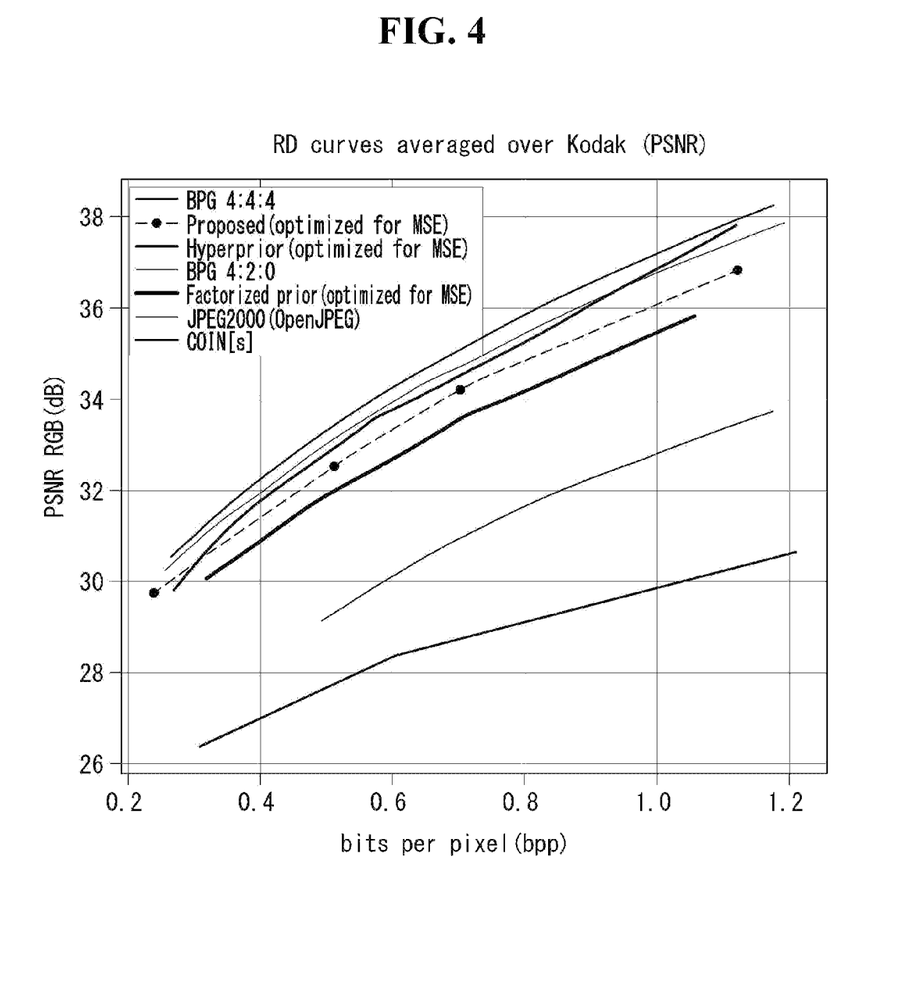
FIG. 4 is a graph comparing rate-distortion for each model for Kodak image dataset in the disclosed embodiment.

FIG. 4 is a graph comparing rate-distortion for each model for Kodak image dataset in the disclosed embodiment.

The neural network-based image compression method according to the disclosed embodiment can be used for a multi-layer perceptron (MLP)-based image compression model and a convolutional neural network (CNN)-based image compression model. The existing multi-layer perceptron (MLP)-based image compression model has lower performance than the convolutional neural network (CNN)-based image compression model even with a lightweight model size, however, when the neural network-based image compression method of the disclosed embodiment is applied, it can be seen that the performance is competitive with the existing convolutional neural network (CNN)-based image compression model.

Figure 5:
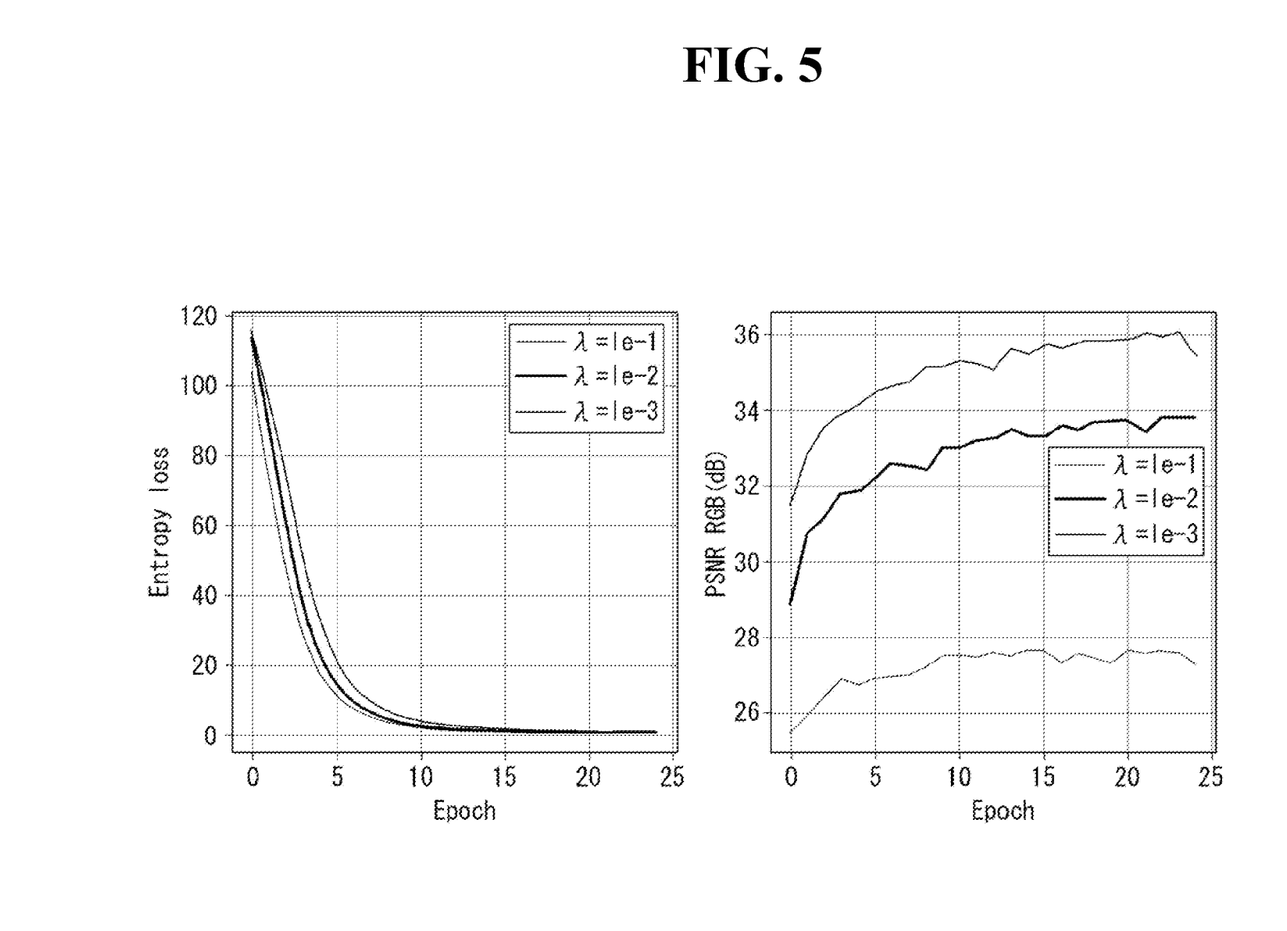
FIG. 5 is graphs illustrating entropy and a reconstruction image quality performance index (PSNR) according to a change in an entropy estimation value adjustment parameter in the disclosed embodiment.

FIG. 5 is graphs illustrating entropy and a reconstruction image quality performance index (PSNR) according to a change in an entropy estimation value adjustment parameter in the disclosed embodiment.

When increasing the value of the adjustment parameter A, in the learning process, the minimization of the network model weight entropy proceeds more rapidly and it has low entropy even after the final learning is completed, however, it can be seen that the performance related to the reconstruction image quality is degraded.

Figure 6:
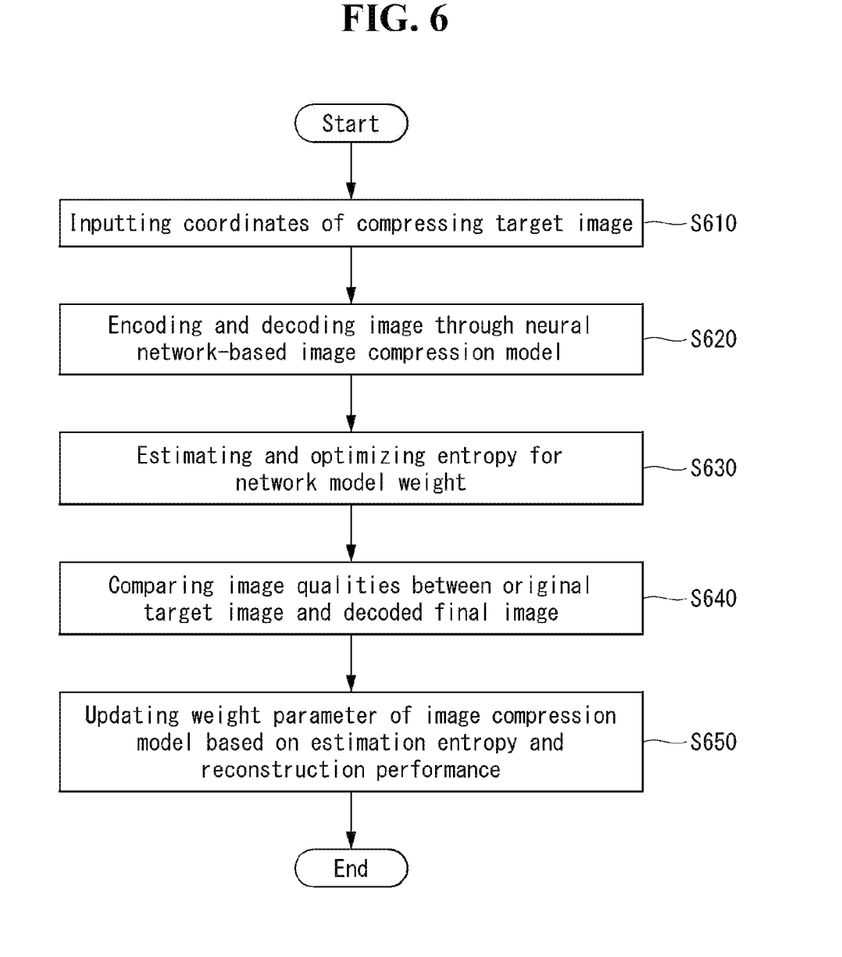
FIG. 6 is a flowchart of a neural network-based image compression method according to the disclosed embodiment.

FIG. 6 is a flowchart of a neural network-based image compression method according to the disclosed embodiment.

The neural network-based image compression method according to the disclosed embodiment may include receiving a compressing target image as an input (S610); encoding the input image through a neural network-based image compression model and decoding the encoded image through the neural network-based image compression model (S620); calculating an entropy estimation value for the network model weight (S630); comparing the image qualities of the compressing target image and the decoded image to calculate a reconstruction performance value (S640); and updating a weight parameter of the neural network-based image compression model based on the entropy estimation value for the network model weight and the reconstruction performance value (S650).

Accordingly, when the weights of the neural network-based image compression model are modified, the size of the weights of the image compression model may be minimized by adding the entropy value of the network model weights to a loss function that is a reference.

Referring again to FIG. 2, the encoding method according to the disclosed embodiment may include receiving, by an encoder, a compressing target image as an input, and generating, by the encoder, streaming data by encoding the input compressing target image through the neural network-based image compression model, the decoding method of the disclosed embodiment may include receiving, by a decoder, an encoded streaming data as an input through the encoder and decoding, by the decoder, the streaming data through the neural network-based image compression model, and a learned neural network-based image compression model of the disclosed embodiment may be used.

On the other hand, embodiments of the present disclosure may be implemented as computer readable codes on a computer-readable recording medium. The computer-readable recording medium includes all types of recording devices in which data that can be read by a computer system is stored.

Examples of computer-readable recording media include ROM, RAM, CD-ROM, magnetic tape, floppy disk, optical data storage device, etc., and also include those implemented in the form of a carrier wave (for example, transmission through the Internet). In addition, the computer-readable recording medium may be distributed to computer systems connected through a network, so that computer-readable codes may be stored and executed in a distributed manner. In addition, functional programs, codes, and code segments for implementing the present disclosure can be easily inferred by programmers in the technical field to which the present disclosure belongs.

Since various modifications may be made to the configurations and methods described and illustrated herein without departing from the scope of the present disclosure, all matters contained in the above detailed description or shown in the accompanying drawings are illustrative and not intended to limit the present disclosure. Accordingly, the scope of the present disclosure is not limited by the above-described exemplary embodiments, and should be defined only in accordance with the following claims and equivalents thereof.

What is claimed is:

1. A method of learning a neural network-based image compression model comprising:
   receiving a learning target image as an input;
   encoding the input image through the neural network-based image compression model configured to include a weight parameter, and decoding the encoded image through the neural network-based image compression model;
   calculating an entropy estimation value for a network model weight of the neural network-based image compression model;
   calculating a reconstruction performance value by comparing qualities of the learning target image and the decoded image; and
   learning the neural network-based image compression model by updating the weight parameter of the neural network-based image compression model based on the entropy estimation value for the network model weight and the reconstruction performance value.

2. The method of claim 1, wherein the entropy estimation value for the network model weight is derived to be minimized.

3. The method of claim 2, wherein a substitution function to which a uniform distribution is added is used to minimize the entropy estimation value for the network model weight.

4. The method of claim 3, wherein the substitution function to which the uniform distribution is added is to add a uniform distribution in a range of −0.5 to 0.5 to the network model weight by an approximate estimation method.

5. The method of claim 1, wherein the update of the weight parameter of the neural network-based image compression model is performed by adjusting the entropy estimation value for the network model weight through the parameter.

6. An encoding method using a method of learning a neural network-based image compression model comprising:
   receiving, by an encoder, a compressing target image as an input, and;
   generating, by the encoder, streaming data by encoding the input compressing target image through the neural network-based image compression model,
   wherein the neural network-based image compression model is a model that receives a learning target image as an input, encodes the learning target image through the neural network-based image compression model configured to include a weight parameter, and decodes the encoded image through the neural network-based image compression model, calculates an entropy estimation value for a network model weight of the neural network-based image compression model, calculates a reconstruction performance value by comparing qualities of the learning target image and the decoded image, and learns by updating the weight parameter of the neural network-based image compression model based on the entropy estimation value for the network model weight and the reconstruction performance value.

7. The method of claim 6, wherein in the neural network-based image compression model, the entropy estimation value for the network model weight is derived to be minimized, a substitution function to which a uniform distribution is added is used to minimize the entropy estimation value for the network model weight, and the substitution function to which the uniform distribution is added is to add a uniform distribution in a range of −0.5 to 0.5 to the network model weight by an approximate estimation method.

8. The method of claim 6, wherein the update of the weight parameter of the neural network-based image compression model is performed by adjusting the entropy estimation value for the network model weight through the parameter.

9. A decoding method using a method of learning a neural network-based image compression model comprising:
   receiving, by a decoder, an encoded streaming data as an input through an encoder; and
   decoding, by the decoder, the streaming data through the neural network-based image compression model,
   wherein the neural network-based image compression model is a model that receives a learning target image as an input, encodes the learning target image through the neural network-based image compression model configured to include a weight parameter, and decodes the encoded image through the neural network-based image compression model, calculates an entropy estimation value for a network model weight of the neural network-based image compression model, calculates a reconstruction performance value by comparing qualities of the learning target image and the decoded image, and learns by updating the weight parameter of the neural network-based image compression model based on the entropy estimation value for the network model weight and the reconstruction performance value.

10. The method of claim 9, wherein in the neural network-based image compression model, the entropy estimation value for the network model weight is derived to be minimized, a substitution function to which a uniform distribution is added is used to minimize the entropy estimation value for the network model weight, and the substitution function to which the uniform distribution is added is to add a uniform distribution in a range of −0.5 to 0.5 to the network model weight by an approximate estimation method.

11. The method of claim 9, wherein the update of the weight parameter of the neural network-based image compression model is performed by adjusting the entropy estimation value for the network model weight through the parameter.

* * * * *